United States Patent [19]

Nagumo

[11] 4,205,336
[45] May 27, 1980

[54] SIGNAL PROCESSING SYSTEM

[75] Inventor: Fumio Nagumo, Yokohama, Japan

[73] Assignee: Sony Corporation, Tokyo, Japan

[21] Appl. No.: 935,005

[22] Filed: Aug. 18, 1978

[30] Foreign Application Priority Data

Aug. 30, 1977 [JP] Japan .................................. 52-10400

[51] Int. Cl.² .............................................. H04N 9/07
[52] U.S. Cl. ..................................................... 358/43
[58] Field of Search ....................... 358/41, 43, 44–46, 358/48

[56] References Cited

U.S. PATENT DOCUMENTS

| | | | |
|---|---|---|---|
| 4,059,839 | 11/1976 | Yamasaka et al. | 358/44 |
| 4,065,785 | 12/1977 | Adcock et al. | 358/44 |
| 4,121,244 | 10/1978 | Nakabe et al. | 358/44 |

FOREIGN PATENT DOCUMENTS 51-96235 8/1976 Japan .

Primary Examiner—John C. Martin
Assistant Examiner—Aristotelis M. Psitos
Attorney, Agent, or Firm—Hill, Van Santen, Steadman, Chiara & Simpson

[57] ABSTRACT

A signal processing system is disclosed for a color television camera having a line-sequential type color coding filter provided in a light path of an object image. An image pick-up device has the object image focused thereon and connects to circuitry for creating a line sequential type color output signal. First and second delay circuits are provided for delaying the output signal and a mixing circuit is provided for mixing the delayed color output signal and an undelayed color output signal to obtain a mixed signal which forms a portion of a luminance signal of the color television camera. Another portion of the luminance signal is derived from an output from the first delay circuit. Preferably the color output signal represents first and second colors such as red and blue and another line-by-line color signal is created for a third color such as green, the green color signal being delayed in a third delay circuit and forming another portion of the luminance signal.

15 Claims, 14 Drawing Figures

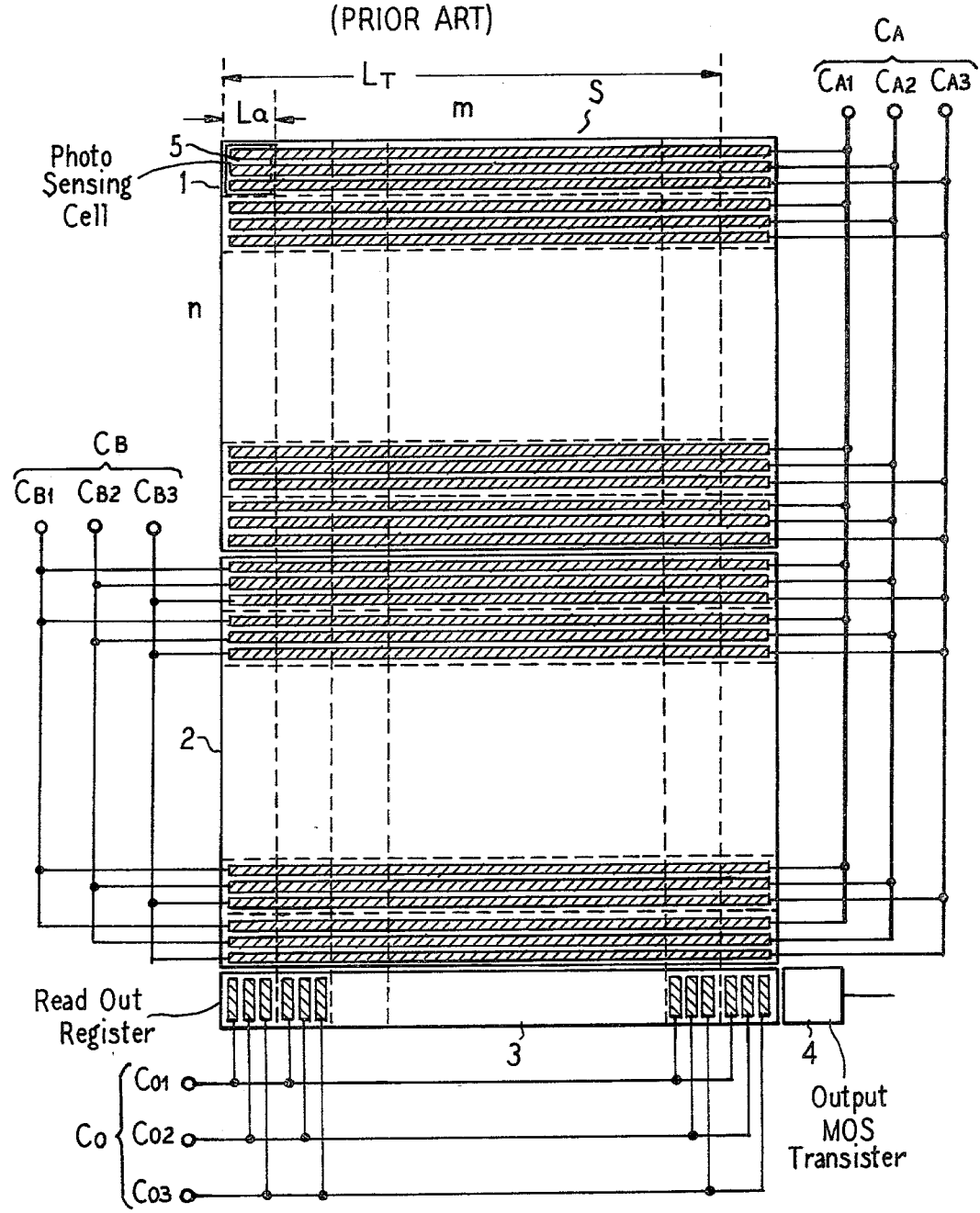

Fig. 4
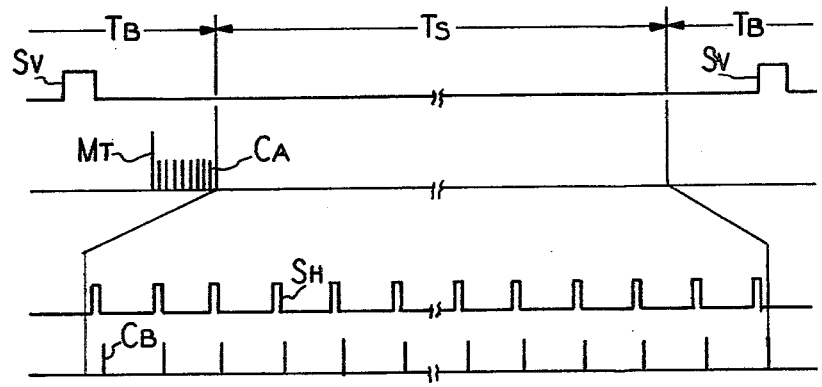
Fig. 6
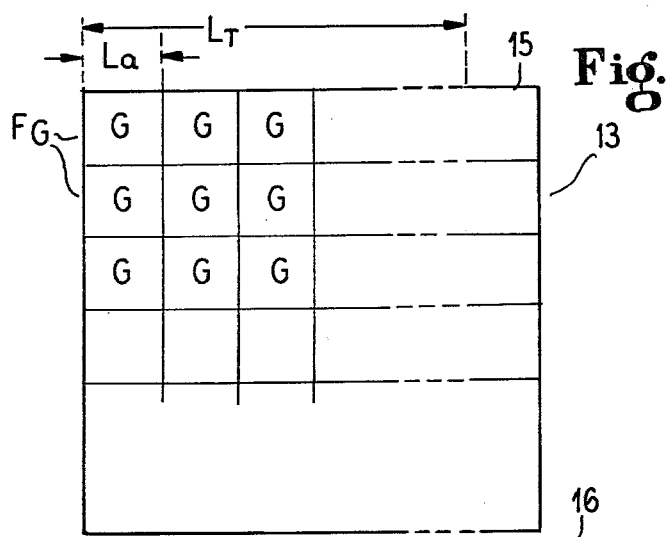
Fig. 7
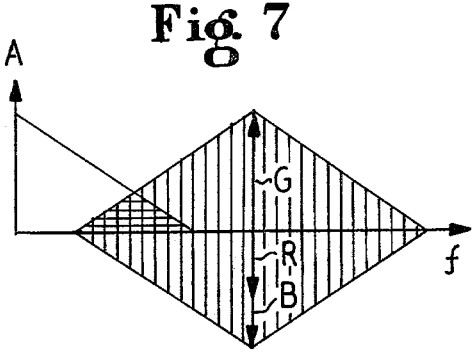
Fig. 8
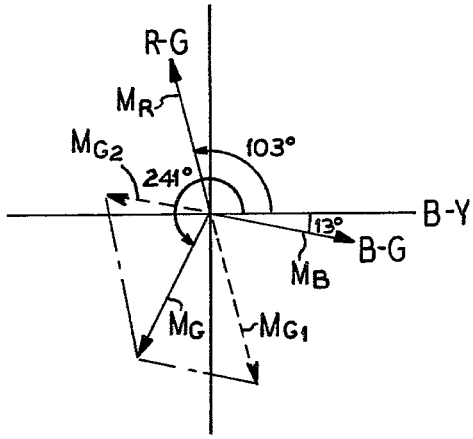
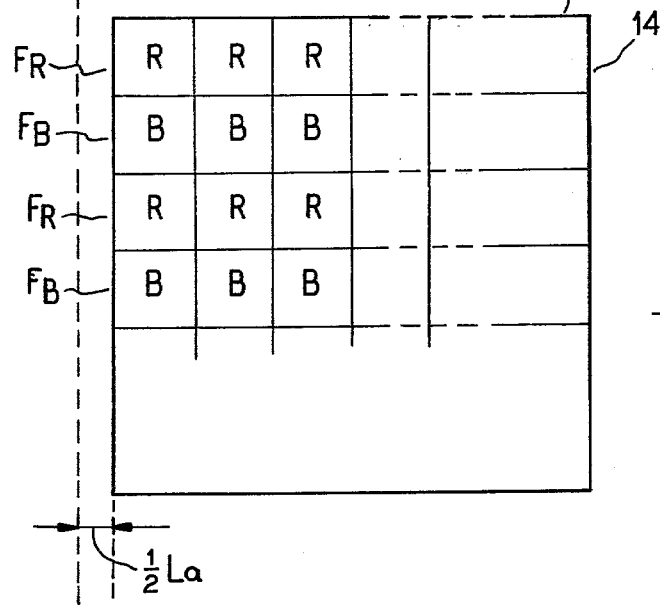

Fig. 9

| | | | | | | | |
|---|---|---|---|---|---|---|---|
| N | R | R | R | R | | R | R | $F_R$
| N+263 | R | R | R | R | | R | R | $F_R$
| N+1 | B | B | B | B | | B | B | $F_B$
| N+264 | B | B | B | B | | B | B | $F_B$

Fig. 10

| | | | | | | | |
|---|---|---|---|---|---|---|---|
| N | G | R | G | R | | G | R |
| N+263 | G | R | G | R | | G | R |
| N+1 | G | B | G | B | | G | B |
| N+264 | G | B | G | B | | G | B |

SIGNAL PROCESSING SYSTEM

BACKGROUND OF THE INVENTION

1. Field of the Invention

This invention relates to a color television camera system, and more particularly to a color television camera system wherein red (R) and blue (B) color signals are line-sequentially obtained from a pickup device.

2. Description of the Prior Art

There have been proposed many types of color television camera systems. Among them, it has been proposed to use a color filter which has red color and blue color elements alternately aligned in the vertical direction. In case of this system, two pick up devices are employed for establishing the entire color television camera system. One of two pick up devices carries the above mentioned red and blue color filters and the other carries a green (G) color filter. In a first approach, a luminance signal is originated by mixing a single line signal of the green pick up device and two lines, namely red and blue lines, of signals of the red-blue pick up device. In such a case, low frequency components of this synthesized luminance signal may include undesired signal components depending on a color condition of the object. The undesired signals are likely to be generated in the luminance signal when blue or red color of the object is gradually changing in the vertical direction of television scanning. FIG. 1A shows color components of an object, wherein red and blue color components are oppositely changed in the vertical direction. If the output of the pick up device is smooth such as shown in FIG. 1A, the synthesized luminance signal may also be smooth as shown in FIG. 2A. But actually, the output of the pick up device has a sampled signal formed by color filter elements. Also, sample timings of blue and red color filter elements are out of phase with each other in the vertical direction. Therefore, changes of red and blue color components from the pick up device show waveforms depicted in FIG. 1B. Accordingly, the synthesized luminance signal of the prior art may include undesired components such as shown in FIG. 2B. These will cause a dot-like pattern in the vertical direction of the reproduced color picture.

SUMMARY OF THE INVENTION

It is a primary object of this invention to provide a new color television camera system.

It is another object of this invention to provide a novel color television camera system wherein line-sequentially aligned color filter elements are employed.

It is a further object of this invention to provide a luminance signal synthesizing system for a line-sequential color camera.

According to the present invention, the luminance signal is generated by using an interpolation technique. Assuming that now red filter line N is being scanned, the luminance component of the blue color signal is generated by interpolating the blue color signals of N−1 and N+1 lines. On the other hand, red color signals of N and N−2 lines are interpolated for generating the luminance components of the red color signal upon scanning the blue filter lines of N−1. Concerning the green color signal, there is no problem because the green color signal is obtained from all lines. The above-mentioned synthesizing technique is preferably applied to low frequency components of the luminance signal.

BRIEF DESCRIPTION OF THE DRAWINGS

FIG. 3 shows a well-known frame transfer type CCD imager.

FIG. 4 shows a timing chart of signals related to the operation of the CCD imager shown in FIG. 1.

FIG. 6 illustrates color coding filters and their positioning relations, relative to an image object, to be used in the system shown in FIG. 5.

FIG. 7 shows a frequency response curve for explaining the cancelling operation when generating high frequency components of the luminance signal in the system shown in FIG. 5.

FIG. 8 shows a vector diagram to be applied to a chrominance signal obtained from a modulator of the system of FIG. 5.

FIG. 9 and FIG. 10 are alternative embodiments of color coding filters for applying this invention to another system other than the one of FIG. 5.

DETAILED DESCRIPTION OF THE PREFERRED EMBODIMENTS

Figure 1A:
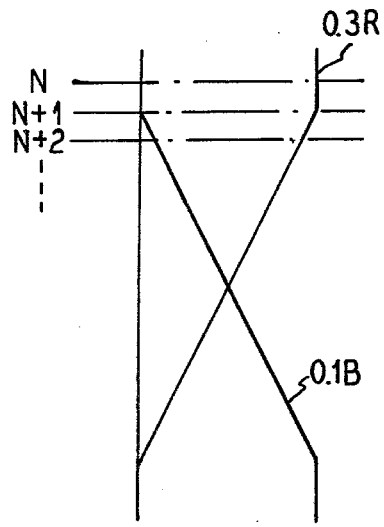
FIGS. 1A to 1C show charts for explaining the operation of the prior art and the present invention.
Figure 1B:
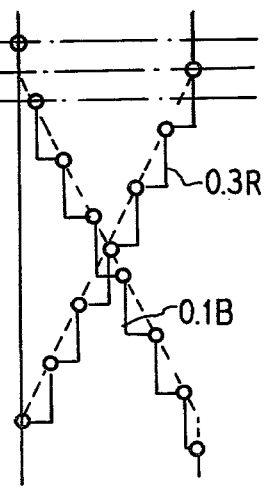

The present invention is applied to a two-chip type CCD linesequential color television camera system in the embodiment of this specification. First, an explanation is given for a solid state imager known as a CCD imager (charge-coupled device imager). FIG. 3 shows one example of CCD imagers. FIG. 4 shows a timing chart of the signals related to the operation of the CCD imager shown in FIG. 3. A 3-phase CCD s consists of a photo sensing array 1 on which a light image of an object (not shown in FIG. 3) is projected. A temporary storage array 2 stores electric charges corresponding to the light information of the image and a read-out register 3 reads out picked up output signals. The arrays 1, 2 and the register 3 are formed on a semiconductor material such as a monocrystalline silicon substrate. The photo sensitive array 1 has m×n number of picture elements aligned in the horizontal and vertical directions at a predetermined alignment pitch La in the horizontal direction. Each of the picture elements has one photo sensing cell 5.

The light information of the image is converted to corresponding electric charges at parts of a semiconductor substrate facing the photo sensing cells 5 which are connected with electrodes CA (CA1, CA2, and CA3) supplied with image sensing biases having a predetermined potential during a vertical scanning interval TS. Therefore, if a well-known transfer clock N having pulses CA which comprises three phase phase pulses CA1, CA2 and CA3 and a following marker signal for starting during a vertical retrace interval which also contains a vertical synchronizing signal are applied to the electrodes CA1 to CA3, the electric charges stored in the semiconductor substrate corresponding to the respective picture elements on the horizontal scanning lines are transferred to the temporary storage array 2 and sequentially stored at the positions corresponding to the horizontal scanning lines at every horizontal scanning line. The temporary storage array 2 is formed similarly to the photo sensitive array 1 but is optically shielded as a whole.

The charges stored in the temporary storage array 2 are read out sequentially with a read out clock pulse or sampling pulse CB which comprises three phase pulses CB1, CB2, CB3 following a horizontal synchronizing signal SH for each horizontal scanning period which is applied to the read out register 3. Thus, a pick-up output signal is derived from an output MOS transistor 4 connected to the read-out register 3. The read-out register 3 has the same number of read-out elements aligned in the horizontal direction and corresponding to the picture elements of the array 1 or 2 in one horizontal scanning line.

If a total length of the photo sensing array in the horizontal direction is $L_T$, then $$L_T = M \times L_a \quad (1)$$

is established.

In case of a NTSC television system, one scan duration is 63.5 μsec. If a retrace interval of television scanning is neglected for simplified understanding, a sampling duration by photo sensing cells 5 is $$\frac{1}{fc} = \frac{63.5 \mu \text{ sec}}{M} = \frac{1}{M \times f_H} \quad (2)$$

where
fc: sampling frequency
fh: horizontal frequency of NTSC system.

Figure 5:
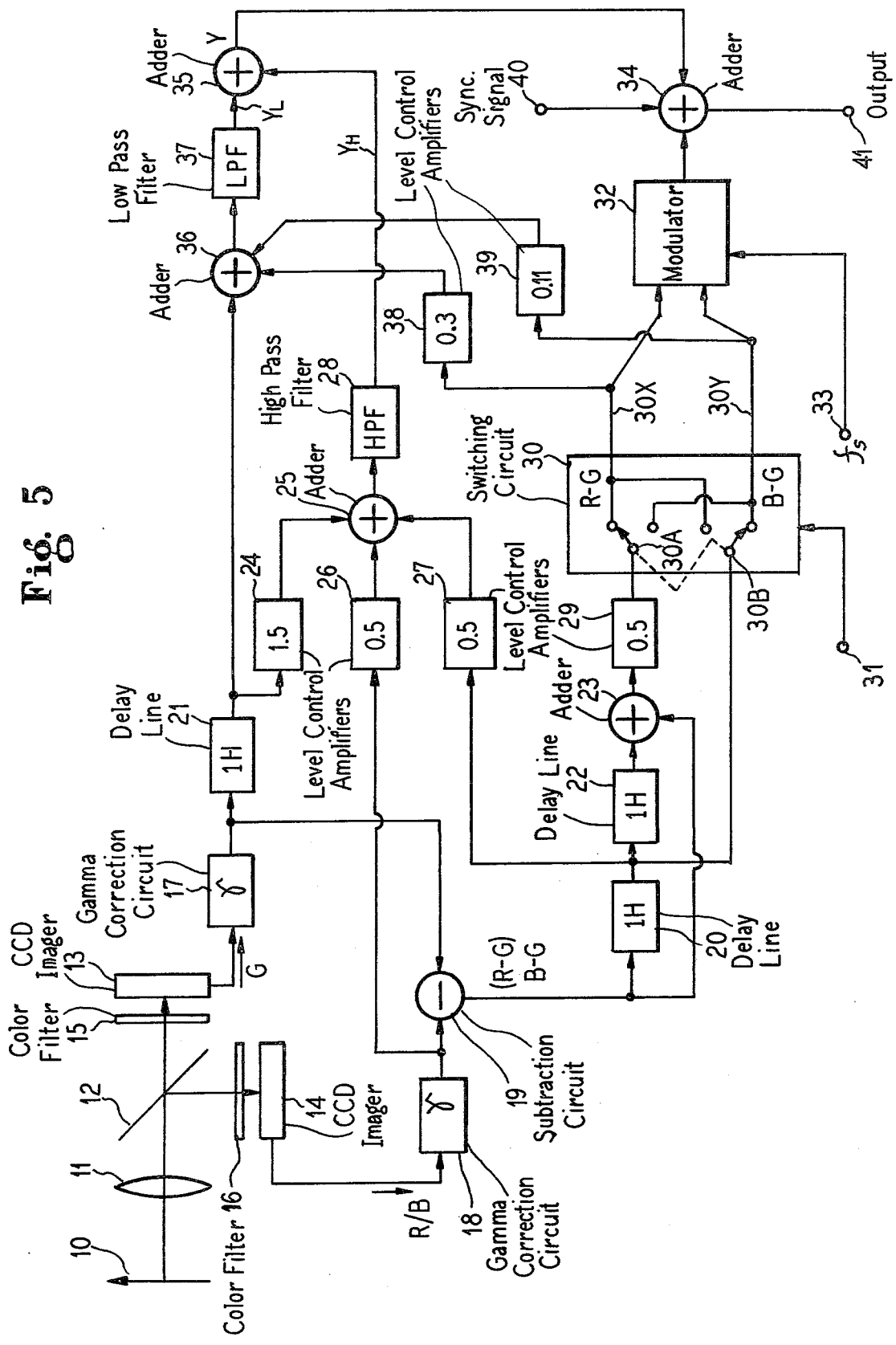
FIG. 5 shows a 2-CCD chip type color television system to which the present invention is applied.

FIG. 5 shows one example of a CCD color television camera system to which the present invention is applied. In the case of this embodiment, two CCD imagers having the same configuration as described and depicted in FIG. 3 are employed. An object 10 is projected through a lens 11 and half mirror 12 on both CCD imagers 13 and 14 each having a color filter 15 and 16, respectively. In this case, respective CCD imagers are displaced by ½ La, namely half of the alignment pitch of picture elements in the horizontal direction relative to the projected image of the object 10. FIG. 6 shows the displacement of two CCD imagers with color filters 15 and 16. In the filter 15, green color elements $F_G$ are positioned at all picture elements of the CCD imager 13, while red color elements $F_R$ and blue color elements $F_B$ are line sequentially positioned at respective lines of the CCD imager 14 in case of the color filter 16. In this arrangement, from CCD imager 13, an output signal corresponding to green color information of the object 10 is obtained from every line. On the other hand, output signals corresponding to red and blue color information are line sequentially obtained from the CCD imager 14. These output signals from two imagers have a phase difference of 180°, namely half of the sampling duration. Namely, CCD imager 13 supplies the green signal G to a gamma (γ) correction circuit 17, while CCD imager 14 supplies a blue signal B and a red signal R to another gamma (γ) correction circuit 18. A subtractor 19 receives output signals from both gamma correction circuits 17 and 18, and supplies difference signals R−G and B−G line sequentially to a 1 H delay line 20 and an adder 23 functioning as a first mixer to create interpolated R−G signals. The output of the gamma correction circuit 17 is also supplied to a 1 H delay line 21. An output of the 1 H delay line 21 is supplied to an adder 25 by way of a level control amplifier 24 having an amplification factor of 1.5, so that the amplifier 24 supplies a signal 1.5 G to the adder 25. Further, there are provided two level control amplifiers 26 and 27 having an amplification factor of 0.5, respectively, The amplifier 26 receives signal R or B from the gamma circuit 18 and the amplifier 27 receives signal (B−G) or (R−G) from the 1 H delay line 20. By adding three outputs from respective amplifier at the adder 25, side band components superimposed in the base band components are cancelled. The output of the adder 25 is expressed as follows;

$$1.5G + 0.5R + (B-G) \times 0.5 = G + 0.5R + 0.5B$$

or $$1.5G + 0.5B + (R-G) \times 0.5 = G + 0.5R + 0.5B.$$

As mentioned before, the signal phase of signal G and signals B and R are out of phase as shown in FIG. 7 and side band components are cancelled. The output of the adder 25 is fed to a high pass filter 28 and is utilized as high components of a luminance signal. Of course, the above described cancelling condition is achieved when the object is monochrome. The output of the adder 23 is fed to a switching circuit 30 by way of a level control amplifier 29, the amplification factor of which is 0.5. Another input of the switching circuit 30 is connected to the output of the 1 H delay line 20 having interpolated B−G signals. The circuit 30 includes a pair of switches 30A and 30B which are actuated in synchronism with a switch pulse supplied through a terminal 31. The switch pulse is a square wave of duty cycle 50% having a frequency of half the horizontal synchronizing frequency. The switching circuit 30 has two output lines 30X and 30Y. The line 30X supplies R−G and the line 30Y supplies B−G, respectively as shown in the following table.

| N: scan line at the imager | 30X | 30Y |
|---|---|---|
| line N | $\frac{(R-G)_N + (R-G)_{N-2}}{2}$ | $(B-G)_{N-1}$ |
| line N + 1 | $(R-G)_N$ | $\frac{(B-G)_{N+1} + (B-G)_{N-1}}{2}$ |
| line N + 2 | $\frac{(R-G)_{N+2} + (R-G)_N}{2}$ | $(B-G)_{N+1}$ |
| ⋮ | ⋮ | ⋮ |

These outputs appear on the lines 30X and 30Y are then fed to a sub-carrier modulating circuit 32 to which a sub-carrier of fs is also supplied through an input terminal 33. At the modulating circuit 32, generally speaking, an R−G signal on the line 30X amplitude-modulates the sub-carrier fs having a phase angle of 103° advanced from the B–Y axis as shown in FIG. 8. On the other hand, the B–G signal on the line 30Y amplitude-modulates the sub-carrier fs having a phase angle of 13° retarded from the B–Y axis as shown in FIG. 8. In the vector analysis, color modulated carrier signal can be considered as two vector signals. For signal (R–G), $M_R$ and $M_{G1}$ and for signal (B–G), $M_B$ and $M_{G2}$ as shown in FIG. 8. The vector sum of $M_{G1}$ and $M_{G2}$ becomes $M_G$ and a phase of the signal $M_G$ is 241° advancing from the B–Y axis. Accordingly, three vectors $M_R$, $M_B$ and $M_G$ are similar to those of the NTSC color system. The chrominance signal thus obtained is then fed to an adder 34 and mixed with the luminance signal Y from another adder 35.

According to the invention, the low frequency components of the luminance signal Y are generated as follows. Namely, the output of the 1H delay 21, R–G interpolated signal on the line 30X, and B–G interpolated signal on the line 30Y are fed to an adder 36 functioning as a second mixer, then fed to a low pass filter 37. Therefore, the low frequency components $Y_L$ is obtained. This signal $Y_L$ is then mixed with the high frequency component $Y_H$ from the high pass filter 28 and resultantly, the luminance signal Y is synthesized. As shown in FIG. 5, there is provided a level control amplifier 38 of amplification factor 0.3, for the R–G signal and an amplifier 39 of amplification factor 0.11 for the B–G signal, respectively.

For the operation according to the invention of the adder 36 there are two conditions. Namely, two kinds of signals are derived from the adder 36 line by line.

$$Y_{LA} = (G)_{N-1} + 0.3\left(\frac{(R-G)_N + (R-G)_{N-2}}{2}\right) + 0.11\{(B-G)_{N-1}\} \quad [1]$$

$$\therefore Y_{LA} = 0.59(G)_{N-1} + 0.3\frac{(R)_N + (R)_{N-2}}{2} +$$

$$0.11(B)_{N-1} + 0.3\left\{(G)_{N-1} - \frac{(G)_N + (G)_{N-2}}{2}\right\}$$

$$Y_{LB} = (G)_N + 0.3\{(R-G)_N\} + 0.11\left\{\frac{(B-G)_{N+1} + (B-G)_{N-1}}{2}\right\} \quad [2]$$

$$\therefore Y_{LB} = 0.59(G)_N + 0.3(R)_N + 0.11\left(\frac{(B)_{N+1} + (B)_{N-1}}{2}\right) +$$

$$0.11\left\{(G)_N - \frac{(G)_{N-1} + (G)_{N+1}}{2}\right\}$$

Figure 1C:
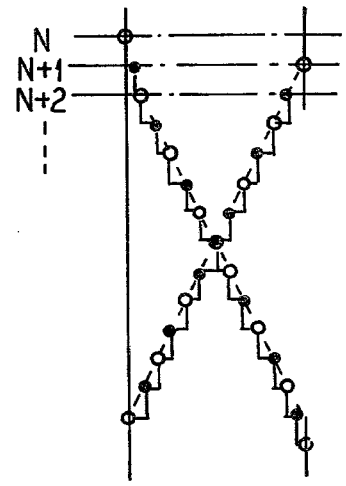
Figure 2A:
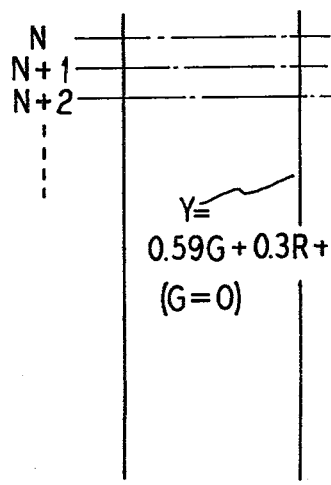
FIGS. 2A to 2C show charts for expressing the resultant luminance signals of the prior art and the present invention.
Figure 2B:
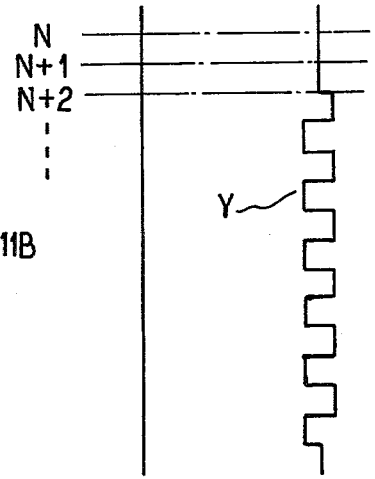
Figure 2C:
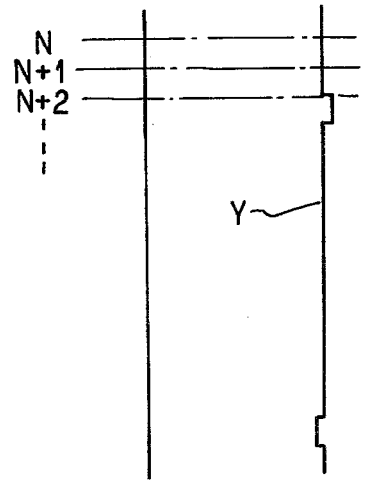

The first three terms of respective equations for $Y_{LA}$ and $Y_{LB}$ represent luminance signal components of NTSC television system. In this luminance signal $Y_{LA}$ or $Y_{LB}$, interpolation is introduced. Namely, in the line where no red signal is obtained due to the line sequential disposition of the color filter, the red signal is generated by interpolation of the red signal from adjacent two lines, namely the lines of 1H after and 1H before the corresponding line. Accordingly, as shown in FIG. 1C by black dots, interpolation is done, and therefore, as shown in FIG. 2C, the synthesized luminance signal has almost no undesired signal components. Further the fourth equation terms of $Y_{LA}$ and $Y_{LB}$, namely $$0.3\left\{(G)_{N-1} - \frac{(G)_N + (G)_{N-2}}{2}\right\}$$

for $Y_{LA}$ and $$0.11\left\{(G)_N - \frac{(G)_{N-1} + (G)_{N+1}}{2}\right\}$$

for $Y_{LB}$ respectively, serve to improve the resolution in the vertical direction. Therefore, an aperture correction signal is to be added to the luminance signal.

The above-described embodiment was provided in a system in which two CCD imagers with non-interlace scanning are employed. In the case where 2:1 interlace scanning is introduced, the color filter 16 in FIG. 6 should be modified as shown in FIG. 9.

Further in the case where only one CCD imager is employed, the color filter 16 may be modified as shown in FIG. 10. In these alternative embodiments, the CCD imager has to accept interlace scanning operation, if the system requires interlace scanning.

Needless to say, this invention is applicable to any pick up device such as a photo diode array, photo transistory array, and even to a vidicon type camera system. A necessary requirement for applying this invention is that the color coding filter is arranged in a line sequential manner with respect to two color components.

Incidentally, a terminal 40 in FIG. 5 receives a composite sync. signal, and 41 is a system output.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A signal processing system for a color television camera having at least a line-sequential type color coding filter disposed in a light path of an object image, comprising:
   (a) an image pick-up device on which said object image is focused;
   (b) means for deriving a line sequential type color output signal alternately formed of non-delayed first and second color signals from said image pick-up device;
   (c) delay means for alternately delaying said first and second non-delayed color signals by two horizontal scan intervals 2H, said delay means also having a 1H delay output; and
   (d) mixing means for interpolating the first color signal when the second color signal is present at the 1H delay output by adding the 2H delayed first color signal to the non-delayed first color signal, and interpolating the second color signal when the first color signal is present at the 1H delay output by adding the 2H delayed second color signal to the non-delayed second color signal, so that said mixing means creates a mixed signal forming a portion of a luminance signal of the color television camera.

2. A signal processing system of claim 1 wherein said delay means includes two 1H delay devices connected in series.

3. A signal processing system of claim 2 wherein said 1H delay output is at a junction point of said two 1H delay devices.

4. A signal processing system of claim 1, further comprising switch means to which said 1H delay output and said mixed signal are supplied, and said switch means having two outputs for producing non-line-sequential color signals to be used as a portion of the luminance signal.

5. A signal processing system as cited in claim 4, wherein said color coding filter modifies said line-sequential type color output signal by red color and blue color of the object image in a line sequential manner.

6. A signal processing system of claim 4, further comprising means for generating a green color signal of said object image line by line, and 1H delay means for delaying the generated green color signal, the delayed green color signal being used as a portion of the luminance signal.

7. A signal processing system of claim 6, further comprising an additional signal mixing means to which said non-line-sequential color signals obtained at said two output terminals of the switch means and the delayed green color signal are supplied for creating said luminance signal.

8. A signal processing system of claim 6, wherein said line sequential type color output signals comprises an (R−G) signal and a (B−G) signal.

9. A signal processing system as cited in claim 7, wherein said additional signal mixing means forms components of the luminance signal.

10. The system of claim 7 wherein the line sequential type color output signals comprise an R−G signal and a B−G signal, and wherein means are provided for supplying the delayed green color signal, R−G signal, and B−G signal to the additional signal mixing means in accordance with the following respective relative levels: 1, 0.3, and 0.11.

11. The system of claim 7 further including adder means connected to the delayed green color signal, line sequential type color output signal, and 1H delay output for creating components of the luminance signal to be utilized as high frequency components; providing a luminance signal producing adder; connecting the additional signal mixing means through a low pass filter to the luminance signal adder; and connecting the adder via a high pass filter to the luminance signal adder.

12. A signal processing system as cited in claim 8, wherein said color television camera has two pick up devices, one for green color in all lines and the other for red and blue colors at alternate lines.

13. The system of claim 1 further comprising means for generating a third color signal of said object image line-by-line, 1H delay means for delaying the generated third color signal, and adder means connected to said line sequential type color output signal, 1H delay output, and delayed third color signal for producing components of the luminance signal utilized as high frequency components.

14. A signal processing system for a color television camera, comprising:
(a) a line-sequential type color coding filter positioned in a light path of an object image, an image pick-up device on which said object image is focused, and means for deriving a line sequential type color output signal corresponding to first and second colors from said image pick-up device;
(b) means for generating a line-by-line color output signal of said object image corresponding to a third color;
(c) first and second series connected delay means connected to receive the line sequential color output signal;
(d) third delay means connected to receive the line-by-line color output signal;
(e) first mixing means connected to the second delay means and line sequential color output signal;
(f) switching means for producing non-line sequential color signals connected to an output of the first mixing means and first delay means; and
(g) second mixing means for producing a luminance signal connected to an output of the switching means and an output of the third delay means.

15. The system of claim 14 wherein the first, second and third delay means provide a delay of 1H.

* * * * *